Aug. 22, 1967

L. J. LA BARRE 3,337,213

TRANSPORT APPARATUS

Filed July 2, 1965

INVENTOR
LAWRENCE J. LA BARRE

BY Q. C. Smith
ATTORNEY 3,337,213
TRANSPORT APPARATUS
Lawrence J. La Barre, Mountain View, Calif., assignor to Hewlett-Packard Company, Palo Alto, Calif., a corporation of California
Filed July 2, 1965, Ser. No. 469,230
6 Claims. (Cl. 271—3)

ABSTRACT OF THE DISCLOSURE

An input drive moves a card past a data processing station and along an arcuate guide to a resilient stop that forces the card back along the arcuate guide and into engagement with an output drive that returns the card to an output station without altering the input orientation of the card.

Figures 1, 2:
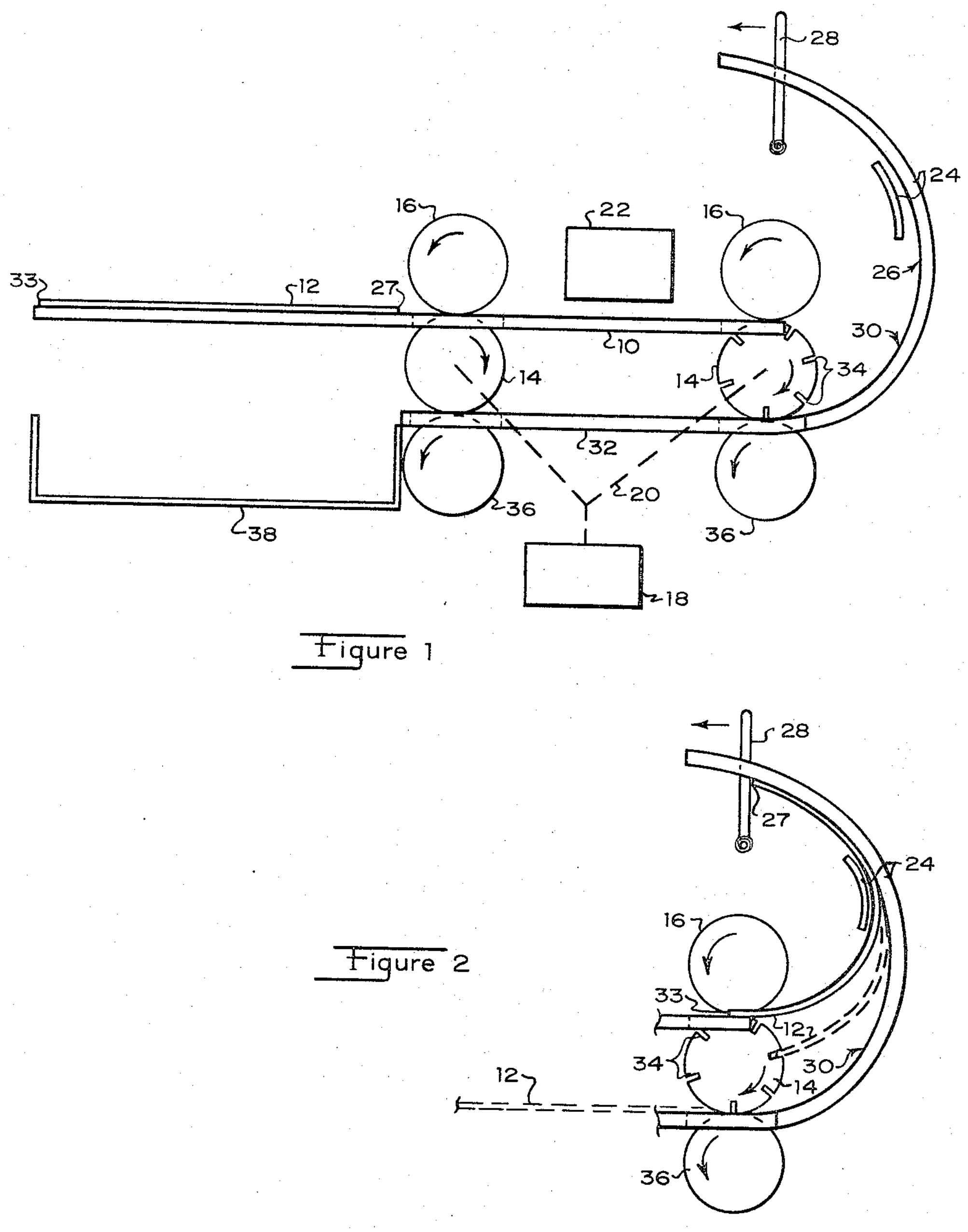

This invention relates to transport apparatus, and more particularly to card handling apparatus for use in data processing.

It is the principal object of this invention to provide card handling apparatus that is simple in construction for receiving data cards at an input end thereof and, after processing of the cards, for returning them in the input position to the input end of the card handling apparatus.

It is another object of this invention to provide an improved and faster card handling apparatus for use in processing data cards.

In accordance with the illustrated embodiment of this invention there is provided card handling apparatus comprising adjacent input and output transport decks each having an associated card drive mechanism and each having corresponding input and output ends. Means are provided for processing a card as it is driven along the input transport deck by the input drive mechanism associated therewith. An arcuate guide is positioned to receive the card as it is driven past the output end of the input transport deck and to guide the card into engagement with a resilient member. This resilient member is displaced as the card is driven against it, but after the card is moved completely past the output end of the input transport deck the resilient member snaps back to its original position. This action together with the natural elasticity of the card which is bowed by the arcuate guide and the rotational movement of a part of the input drive mechanism against the trailing edge of the card is sufficient to force the card back along an extension of the arcuate guide onto the output transport deck and into engagement with the output drive mechanism associated therewith. The card is then moved along the output transport deck to a return bin at the input end of the card handling apparatus.

Other and incidental objects of this invention will become apparent from a reading of this specification and an inspection of the accompanying drawing in which:

FIGURE 1 is a schematic diagram of a card handling apparatus in accordance with this invention; and FIGURE 2 is a detail view showing the operation of the mechanism of FIGURE 1 for reversing the direction of movement of a card.

Referring to FIGURE 1, there is shown an input transport deck 10 with an associated input card drive mechanism for engaging a card 12 and moving it along the input transport deck 10 in a forward direction from the input end to the output end thereof. This input card drive mechanism comprises a set of rotary elements 14 rotatably mounted below the input transport deck 10, but protruding through slots therein to engage another set of rotary elements 16 rotatably mounted above the input transport deck. The input card drive mechanism is driven by a prime mover 18 which is mechanically linked to the set of rotary elements 14, as indicated at 20, for driving them in a clockwise direction. A data processing unit 22, such as a printer or readout device, is positioned adjacent to the input transport deck 10 for processing the card 12 as it moves therealong.

Referring now to FIGURES 1 and 2, an arcuate guide 24 including a first portion 26 is positioned for receiving the card 12 as it is driven past the output end of the input transport deck 10. This arcuate guide 24 is formed with a sufficiently large radius to avoid exceeding the elastic limit of the card. As the trailing portion of the card 12 is driven past the output end of the input transport deck 10 by the input card drive mechanism, the leading edge 27 of the card 12 is guided into engagement with a resilient member 28. This resilient member 28 is displaced in a counterclockwise direction as the leading edge 27 of the card 12 is driven against it by the input card drive mechanism. After the card 12 is completely driven past the output end of the input transport deck 10, the displaced resilient member 28 snaps back to its original position. This action forces the card 12 in an opposite or backward direction along the arcuate guide 24 which includes a second portion or extension 30 positioned so as to guide the card onto the output transport deck 32 positioned beneath and parallel to the input transport deck 10 and into engagement with the output card drive mechanism. As the trailing edge 33 of the card 12 is driven past the output end of the input transport deck 10, the elasticity of the card which is bowed by the arcuate guide 24 naturally causes the trailing portion of the card to spring away from the input transport deck and against the arcuate guide 24. This natural action is enhanced by grooves 34 provided in the rotary elements 14 at the output end of the input transport deck 10 for engaging the trailing edge of the card 12 and driving it clear of the input transport deck 10. The above described mechanism for reversing the direction of movement of the card 12 makes it possible to feed cards for processing at higher rates than is commonly the case, for one card may be driven into the guide 24 while another is being forced out without hindering the operation of the mechanism.

The output card drive mechanism comprises a set of rotary elements 36 which are rotatably mounted below the output transport deck 32 so as to protrude through slots provided therein and engage the driver set of rotary elements 14. This output card drive moves the processed card across the output transport deck 32 and deposits it in a return bin 38 located at the input end of the card handling apparatus. It should be noted that the processed card 12 is oriented in exactly the same manner when it is deposited in the return bin 38 as it was when fed into the card handling apparatus.

I claim:

1. Transport apparatus for handling a card, said apparatus comprising:

a card feed input for the card;

a first drive mechanism for engaging the card at said card feed input and for moving the card forward in its input orientation along a first transport path having an output end;

means including a stop for stopping the forward movement of the card, said stop forcing the card backward in its input orientation to a second transport path;

a card feed output for the card, said card feed output being positioned adjacent to said card feed input; and a second drive mechanism for engaging the card when it is forced backward to said second transport path and for moving the card in its input orientation along said second transport path to said card feed output.

2. Transport apparatus as in claim 1 including:

a transport deck in said first transport path to support the card as it moves along said first transport path; and means positioned adjacent to said transport deck for processing the card as it is moved in said first transport path along said transport deck.

3. Transport apparatus as in claim 2 wherein:

said stop is resilient; and said means includes an arcuate guide for receiving the card as it is driven past the output end of said first transport path, said arcuate guide bowing the card and guiding it into engagement with said resilient stop so that after the card is moved forward past the output end of said first transport path the card is forced backward along said arcuate guide to said second transport path.

4. Transport apparatus for use in processing a card, said apparatus comprising:

a transport deck having an input and an output end with reference to movement of said card in one direction therealong;

a drive mechanism for engaging said card and moving it in said one direction along one side of said transport deck and in the opposite direction on the other side of said transport deck;

means for processing said card as it is moved in said one direction along said transport deck;

an arcuate guide including a first portion for receiving said card as it is driven in said one direction past the output end of said transport deck;

a resilient member positioned for engaging said card and being displaced by said card as it is moved in said one direction along said guide;

said resilient member being disposed for returning to its original position after said card is moved past the output end of said transport deck, thereby forcing said card in said opposite direction back along said guide; and means including a second portion of said guide for guiding said card moving in said opposite direction past said output end and into engagement with said drive mechanism for continued movement in said opposite direction toward said input end on the other side of said transport deck.

5. Transport apparatus for use in processing a card, said apparatus comprising:

first and second adjacent transport decks each having an input and an output end with reference to movement of said card therealong;

a drive mechanism for engaging said card and moving it in one direction along one side of said first transport deck and in the opposite direction along one side of said second transport deck;

means for processing said card as it is moved in said one direction along said first transport deck;

an arcuate guide including a first portion positioned for receiving said card as it is driven in said one direction past the output end of said first transport deck;

a resilient member disposed near one end of said guide for engaging the leading edge of said card and being displaced by said card as the trailing portion thereof is moved in said one direction past the output end of said first transport deck;

said resilient member being disposed for returning to its original position after said card is completely moved past the output end of said first transport deck, thereby forcing said card in the opposite direction back along said guide; and means including a second portion of said guide for guiding said card moving in said opposite direction past the output end of said first transport deck, onto said second transport deck, and into engagement with said drive mechanism for continued movement in said opposite direction to the output end of said second transport deck which is adjacent to the input end of said first transport deck.

6. Transport apparatus for use in processing a card, said apparatus comprising:

a transport deck having an input and an output end with reference to movement of said card in one direction therealong;

a first drive mechanism including a first set of rotary elements rotatably mounted below said transport deck for cooperating with a second set of rotary elements rotatably mounted above said transport deck through slots provided therein to engage said card and move it in said one direction along one side of said transport deck;

means for processing said card as it is moved in said one direction along said one side of the transport deck by said first drive mechanism;

an arcuate guide positioned near the output end of said transport deck and including a first portion for receiving said card as it is driven in said one direction past said output end;

a resilient member positioned near one end of said arcuate guide for engaging said card and being displaced by said card as the trailing portion thereof is moved in said one direction past the output end of said transport deck;

said resilient member being disposed for returning to its original position after said card is completely moved past the output end of said transport deck, thereby forcing said card in the opposite direction back along said guide; and means including grooves in the rotary elements of said first set mounted at the output end of said transport deck, and including a second portion of said arcuate guide for guiding said card moving in said opposite direction past the output end of said transport deck and into engagement with a second drive mechanism;

said second drive mechanism including said first set of rotary elements rotatably mounted below said transport deck and cooperating with a third set of rotary elements rotatably mounted below said transport deck to engage said card and move it in said opposite direction on the other side of said transport deck to a storage area adjacent the input end of said transport deck.

References Cited

UNITED STATES PATENTS

| | | | |
|---|---|---|---|
| 2,384,768 | 9/1945 | Rau. | |
| 2,901,246 | 8/1959 | Wagner | 271—3 |
| 3,052,468 | 9/1962 | Cutaia et al. | 271—71 |
| 3,087,725 | 4/1963 | Buncan | 271—71 |
| 3,273,886 | 9/1966 | Taylor | 271—69 X |

M. HENSON WOOD, Jr., *Primary Examiner.*

J. N. ERLICH, *Assistant Examiner.*